United States Patent
Dwan et al.

(10) Patent No.: US 9,525,789 B2
(45) Date of Patent: Dec. 20, 2016

(54) SHUFFLE ALGORITHM AND NAVIGATION

(71) Applicant: Dropbox, Inc., San Francisco, CA (US)

(72) Inventors: Michael Dwan, San Francisco, CA (US); Jinpeng Ren, Mountain View, CA (US)

(73) Assignee: DROPBOX, INC., San Francisco, CA (US)

( * ) Notice: Subject to any disclaimer, the term of this patent is extended or adjusted under 35 U.S.C. 154(b) by 392 days.

(21) Appl. No.: 13/888,003

(22) Filed: May 6, 2013

(65) Prior Publication Data

US 2014/0270571 A1   Sep. 18, 2014

Related U.S. Application Data

(60) Provisional application No. 61/800,039, filed on Mar. 15, 2013.

(51) Int. Cl.
*H04N 1/00*           (2006.01)
(52) U.S. Cl.
CPC ................................. *H04N 1/00453* (2013.01)
(58) Field of Classification Search
None
See application file for complete search history.

(56) References Cited

U.S. PATENT DOCUMENTS

| | | | |
|---|---|---|---|
| 6,259,457 B1 * | 7/2001 | Davies | G06T 11/00 345/629 |
| 7,925,833 B2 | 4/2011 | Sato et al. | |
| 8,296,657 B2 | 10/2012 | Penic et al. | |
| 2002/0167538 A1 * | 11/2002 | Bhetanabhotla | 345/700 |
| 2006/0242599 A1 * | 10/2006 | Choo | G06F 17/30899 715/821 |
| 2008/0165146 A1 * | 7/2008 | Matas | G06F 1/1626 345/173 |
| 2008/0309795 A1 | 12/2008 | Mitsuhashi et al. | |
| 2008/0310688 A1 * | 12/2008 | Goldberg | G06F 17/30256 382/118 |
| 2009/0232409 A1 * | 9/2009 | Marchesotti | G03B 27/735 382/254 |

(Continued)

*Primary Examiner* — Michelle Entezari
(74) *Attorney, Agent, or Firm* — Keller Jolley Preece

(57) ABSTRACT

Embodiments are disclosed for randomly and pseudo-randomly presenting images to a user. An exemplary method includes receiving a first set of images from a user, receiving a second set of conditions that an image must satisfy, creating a subset of the first set of images that satisfies the second set of conditions, selecting a random element of said subset, and displaying said random element to a user. The conditions define the breadth or narrowness of the subset of images from which a random element is chosen. The conditions may be system set, user configured, or any combination, and a user may repeat the process, or may choose to view a new image that has one or more affinities to the last randomly chosen image presented. Affinities function in similar manner to the conditions of a pseudo-random selection, but generally serve to narrow the available set of photos to a greater extent. Conditions or affinities may be, for example, time based, location based, event based, based on a relationship of the user to a person appearing in the last displayed photo, or based upon various other defined connections or commonalities.

26 Claims, 7 Drawing Sheets

(56) References Cited

U.S. PATENT DOCUMENTS

| | | | |
|---|---|---|---|
| 2010/0070926 A1* | 3/2010 | Abanami | G06F 1/1626 |
| | | | 715/835 |
| 2010/0094441 A1 | 4/2010 | Mochizuki et al. | |
| 2010/0131574 A1 | 5/2010 | Reese et al. | |
| 2010/0261987 A1* | 10/2010 | Kamath | A61B 5/14532 |
| | | | 600/365 |
| 2011/0169757 A1 | 7/2011 | Kiddle et al. | |
| 2011/0302493 A1* | 12/2011 | Runstedler | G06F 17/30053 |
| | | | 715/716 |
| 2012/0143857 A1* | 6/2012 | Gronow et al. | 707/723 |
| 2013/0021368 A1* | 1/2013 | Lee et al. | 345/619 |
| 2013/0117365 A1* | 5/2013 | Padmanabhan et al. | 709/204 |
| 2013/0117692 A1* | 5/2013 | Padmanabhan et al. | 715/753 |
| 2013/0340057 A1* | 12/2013 | Kitlyar | G06F 21/36 |
| | | | 726/6 |
| 2015/0127628 A1* | 5/2015 | Rathod | 707/710 |

\* cited by examiner

FIG. 4

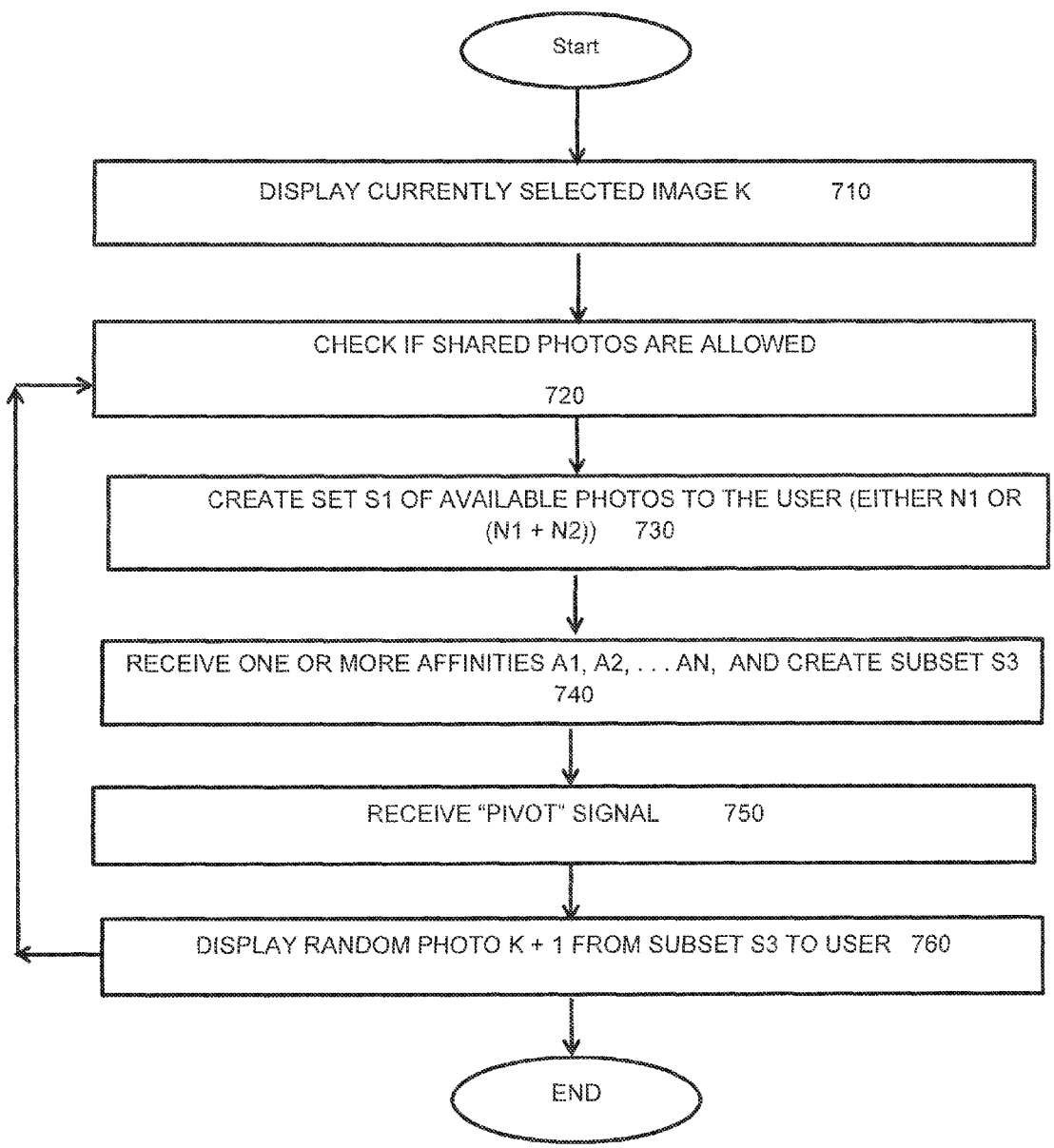

SHUFFLE ALGORITHM AND NAVIGATION

CROSS-REFERENCE TO RELATED PROVISIONAL APPLICATION

This application claims the benefit of U.S. Provisional Patent Application No. 61/800,039 filed on Mar. 15, 2013, the disclosure of which is incorporated herein by reference in its entirety.

FIELD OF THE INVENTION

Various embodiments relate generally to shuffling content and to navigation from a content item.

BACKGROUND

Recent technological advancement in capturing and recording images include features that allow users to capture and record images in rapid succession, often within microseconds or seconds of each other, thus creating large sets of user photos. With the decrease in costs for storage, users often store a large number of their captured photos both on their cameras and in remote storage. Instead of reviewing and organizing photos on the camera or within storage when a user's memory about the recently captured photos is still fresh, users simply upload the entire set to content management systems to review and organize their captured images at a later date.

As the number of photos both on the camera and within storage increases, the task of organizing stored photos becomes overwhelming. Adding to the complexity in organizing photos, the user may also have images from other sources, such as images shared by others and/or from multiple devices, often times captured at events or subject matter of other photos stored by the user, but, the photos may not be stored together because they were uploaded from different sources or at different times. As the number of photos stored for a user both increases and are provided from multiple sources, organization and presentation of photos within a user interface that communicates in a meaningful way what images are stored for the user becomes more complex.

Moreover, given the large numbers of photographs stored in a user's account, when it comes time for users to look at what has been uploaded, they are often at a loss as to what to look at. They often cannot recall what has been uploaded months earlier, for example. In order to keep users interested and engaged with the system and its website, interesting ways of presenting a user's own photos and images back to him or her need to be devised. In particular, methods that engage a user and "think" on their own, and do not require a user to do all the work are a desideratum.

Accordingly, there is a need for improved organization and presentation of images.

SUMMARY

Embodiments are disclosed for randomly and pseudo-randomly presenting images to a user. An exemplary method includes receiving a first set of images from a user, receiving a second set of conditions that an image must satisfy, creating a subset of the first set of images that satisfies the second set of conditions, selecting a random element of said subset, and displaying said random element to a user. The set of images may include both a user's images and those shared with the user. The conditions define the breadth or narrowness of the subset of images from which a random element is chosen. The conditions may be system set, user configured, or any combination, and a user may repeat the process, or may choose to view a new image that has one or more affinities to the last randomly chosen image presented. Affinities function in similar manner to the conditions of a pseudo-random selection, but generally serve to narrow the available set of photos to a greater extent. Conditions or affinities may be, for example, time based, location based, event based, based on a relationship of the user to a person appearing in the last displayed photo, or based upon various other defined connections or commonalities.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 4 illustrates an exemplary user interface for presentation and organization of content in accordance with some embodiments of the invention.

FIG. 7 is an exemplary flowchart for presentation of content via a pivot or subsequent navigation in accordance with some embodiments of the invention;

DETAILED DESCRIPTION OF THE DISCLOSURE

Figure 1:
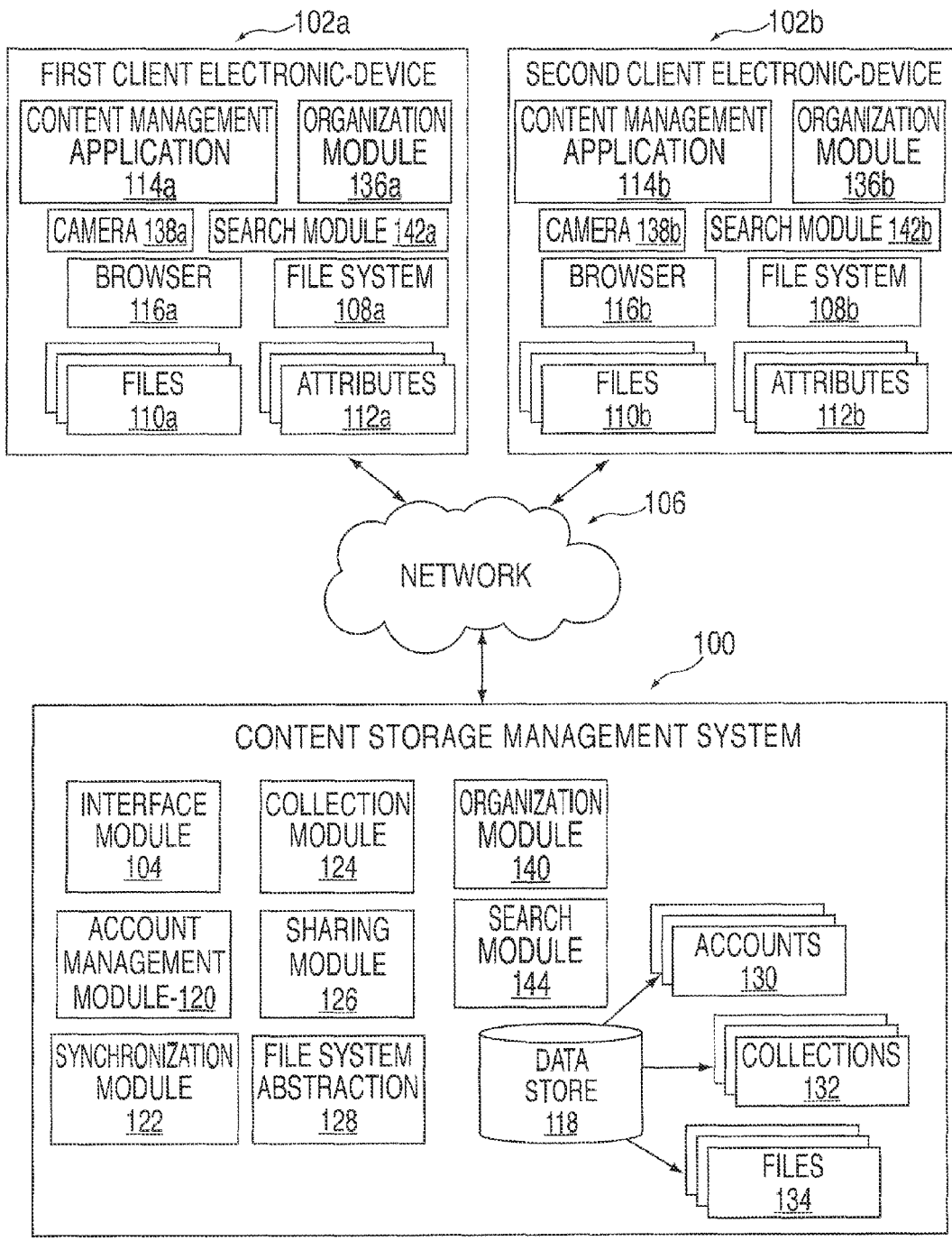
FIG. 1 is an exemplary system for presentation and organization of content in accordance with some embodiments of the invention.

Methods, systems, and computer readable mediums for random and pseudo random presentations of stored photos are provided. Content items managed by a content management system may be organized and then presented within a user interface to encourage the user to interact with the system, educate the user on the content items managed by the content management system and keep users interested and engaged.

Content items may be clustered on a client device prior to upload to the content management system, upon upload to a content management system, and/or any combination thereof. In some embodiments, content items (e.g., thumbnail or other representation for an image) may be displayed within the user interface with the other content items from the corresponding cluster, with an indicator for the corresponding cluster, and/or with a link to navigate to another user interface to display the cluster.

User interfaces may provide a sample of content items managed by the content management system displayed within mosaics with rows and columns. Each row of a mosaic may have content items (e.g., thumbnails or other representations) displayed in a temporal sequence. The rows of the mosaic may display content items for a particular unit of time (e.g., years, months, days). The sample may be random or pseudo-random selection of images that are continually updated to ensure that the user is educated about the contents within their account with the content management system. A user can then select an image from a sample displayed within the user interface and navigate to a user interface to view the content items clustered with the selected image.

For purposes of description and simplicity, methods, systems and computer readable mediums will be described for a content storage and management service, and in particular, organization and presentation of content items (e.g., images). However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described for organizing and presenting content items may be used for a variety of storage providers/services and types of content, files, portions of files, and/or other types of data.

Shuffle functionality is a random or pseudo-random selection of photos for presentation to user on a dashboard or other UI, that is used to select one from a set of photos to a user. Upon display of the randomly chosen photo, a user may retrieve more information regarding the photo, and may navigate to the display set of photos (e.g., cluster of photos) to which the selected photo belongs, or may, for example, navigate to other related photos, within and not within related clusters. A user may repeatedly shuffle her "deck of photos", either wholly randomly, or within a subset of all of her photos, to see a variety of available content. Such a subset may be chosen based on a set of conditions to first create a limited universe on which a random operator can act. On an exemplary iPhone or other smartphone application, for example, a user may swipe or shake the iPhone to move to the next photo.

Thus, in an answer to the implicit user directive "Surprise me!", a content management system can continuously "shuffle" the available images and photos, in both purely random, as well as pseudo-random ways. There may always be an aspect of randomness, but there will also be various values or flags that may direct the search, and control the randomness. These flags or values constitute additional conditions which the set of photos that is presented to a user must satisfy, and the logic for satisfying the conditions operates on metadata associated with the stored photos. For example, by clicking a "shuffle" button on a user interface, the system can present a random sampling of photos distributed evenly across a defined time frame, such as N photos evenly distributed across the time interval in which a user has had an account. Or, for example, a set of random photos from a defined time interval in the past, such as "2011." Or, for example, a random set of photos taken while at college.

Once the user sees the initial shuffle results, the function may be applied again and again, for a "romp" or "random walk" through all available content to that user. Or, alternatively, the user may choose to see photos or content related to the shuffle result in some way. Such "navigation from a shuffle result" functionality, which may be applied to any content item regardless of how it was presented to a user, can also have a random aspect that is guided or constrained by certain conditions or affinities. This functionality is related to a pre-conditioned shuffle, and is sometimes known herein as a "pivot" functionality. For example, if an initial shuffle includes a photo or photos from a certain group event, a user may choose to subsequently view other photos related in some way to the date, time or location of that photo, or she may choose to see other photos containing similar content, such as friends.

It is noted that unlike random shuffles, both pseudo-random shuffles and pivots are functionally related to clustering functionality, in that metadata associated with a content item is used to either include or exclude photos available to a user in a set form which a random photo can be chosen. Such a subset, dynamically created, is essentially a type of cluster, and the conditions or affinities which constrain and guide a pseudo random presentation of a photo to a user are analogous to similarity rules used in clustering. Further details on clustering are provided in companion patent application entitled "PRESENTATION AND ORGANIZATION OF CONTENT", Application No. 61/794,184, filed on Mar. 15, 2103, which is hereby fully incorporated herein by this reference.

FIG. 1 is an exemplary system for presentation and organization of content in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

In particular, client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include creation time, geolocation, orientation, rotation, title, and/or any other attributes or data relevant to the captured image. Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

An organization module 136 (e.g., 136a and 136b) may be used to organize content items (e.g., image files) into clusters, organize content items to provide samples of content items for display within user interfaces, and/or retrieve organized content items for presentation. The organization module 136 may utilize any clustering algorithm, including, but not limited to, algorithms implementing at least a portion of the ROCK algorithm and/or any other clustering algorithm. The ROCK algorithm is described in Guha, S., et al., "*ROCK: A Robust Clustering Algorithm for Categorical Attributes*," Proceedings of the 15$^{th}$ International Conference on Data Engineering (ICDE '99), IEEE Computer Society, Washington, D.C., USA, pp. 512-521 (1999). and is hereby incorporated by reference in its entirety. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item for a particular date, and the search may be handled by searching cluster markers of stored images. For example, cluster markers may indicate an approximate time or average time for the images stored with the cluster marker in some embodiments, and the marker may be used to speed the search and/or return the search results with the at least one image file of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112 or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104. Web browser 116a and 116b (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 124 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102a can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with Content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing content publicly can include making the content item and/or the collection accessible from any computing device in network communication with content management system 100. Sharing content privately can include linking a content item and/or a collection in data store 118 with two or more user accounts so that each user account has access to the content item. In particular, the sharing module 126 can be used with the collections module 124 to allow sharing of a virtual collection with another user or user account. The sharing can be performed in a platform independent manner. That is, the content can be shared across multiple client devices 102 of varying type, capabilities, operating systems, etc. The content can also be shared across varying types of user accounts. A lightweight share, akin to a virtual collection, may be a grouping of content identifiers that may be stored in various locations within file system of client device 102 and/or stored remotely at content management system 100.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts.

To share a content item privately, sharing module 126 can be configured to add a user account identifier to the content entry or database table row associated with the content item, thus granting the added user account access to the content item. Sharing module 126 can also be configured to remove user account identifiers from a content entry or database table rows to restrict a user account's access to the content item. The sharing module 126 may also be used to add and remove user account identifiers to a database table for virtual collections.

To share content publicly, sharing module 126 can be configured to generate a custom network address, such as a uniform resource locator (URL), which allows any web browser to access the content in content management system 100 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

Figure 2:
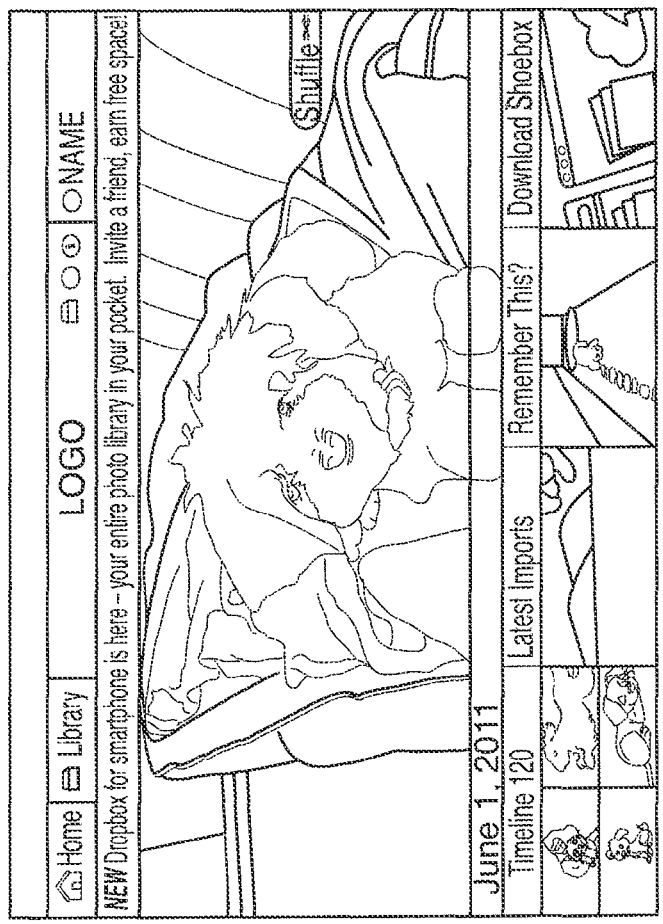
FIG. 2 illustrates an exemplary user interface for presentation and organization of content in accordance with some embodiments of the invention.
Figure 3:
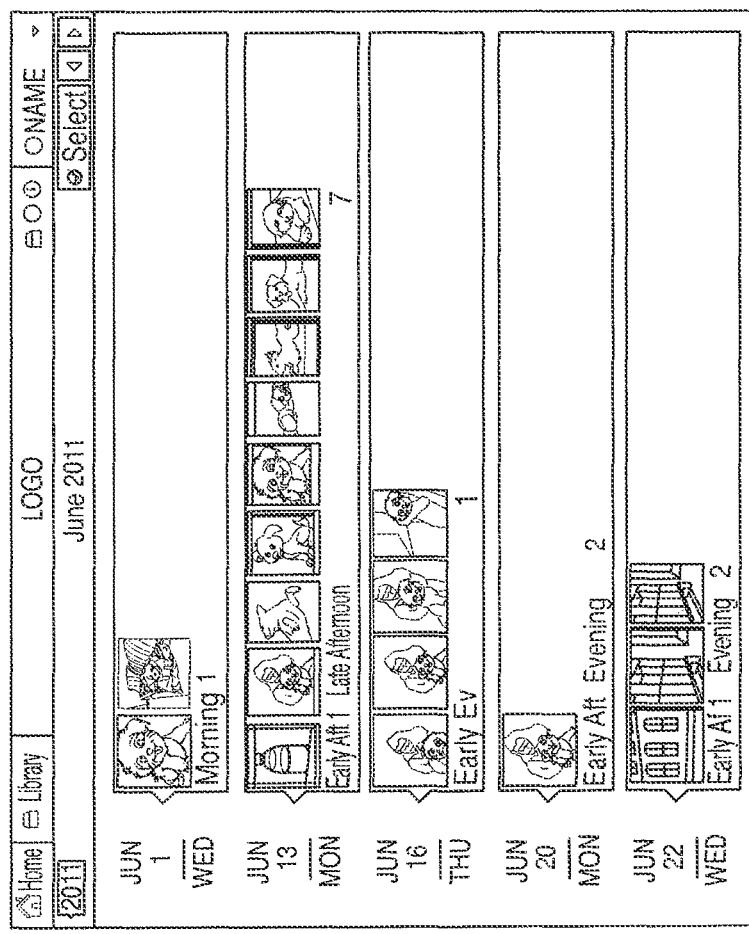
FIG. 3 illustrates an exemplary user interface for presentation and organization of content in accordance with some embodiments of the invention.
Figure 4:
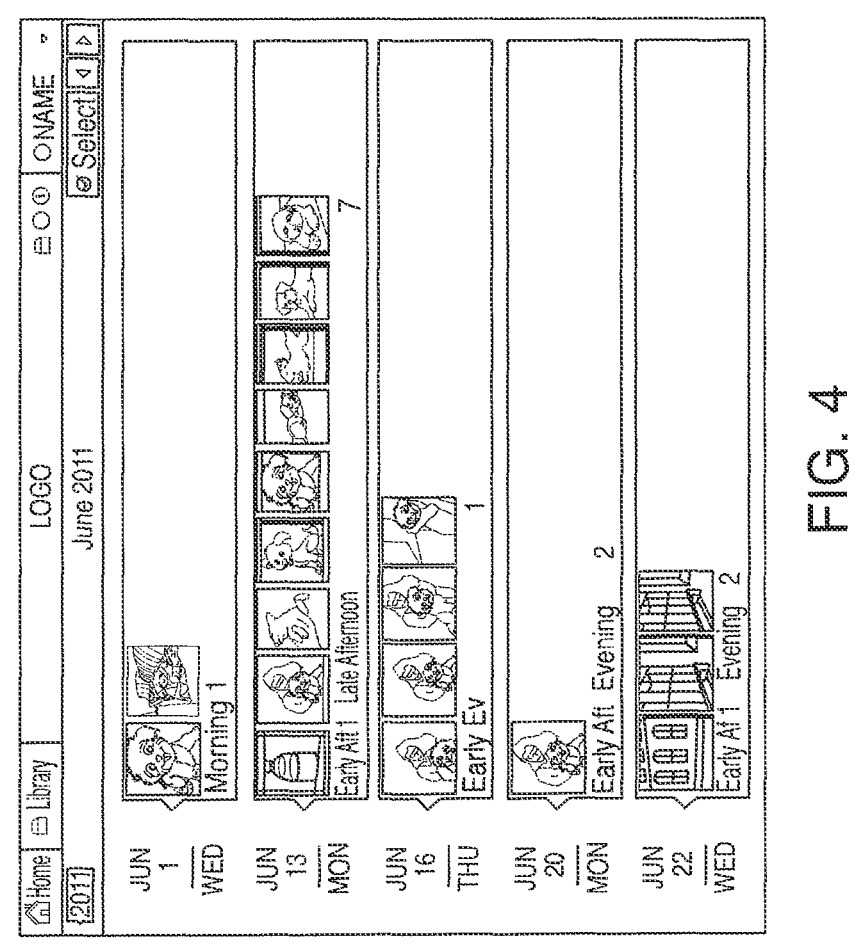

Next described are FIG. 2-4 which illustrate exemplary presentation of photos to a user using a shuffle feature or functionality according to exemplary embodiments of the present invention.

With reference to FIG. 2, there is seen an exemplary user interface for a content management system 100 such as is shown in FIG. 1. In the main screen of the user interface, there is seen a photograph of a dog sitting on a couch, which has been presented to a user in response to, for example, a shuffle interaction. There is also seen at the right side of the main screen a button labeled "Shuffle" which the user engages with to have a random or pseudo-random photo displayed. Below the main screen are seen various exemplary system functionalities which the user may engage with if no additional shuffle is desired. Also visible is the date of the displayed photo, in this case Jun. 1, 2011, as well as various other buttons associated with the exemplary content management system. At the top of the screen is a space for a logo or other designator of an exemplary system, such as a trademark or trade name, for example.

At this point the user may signal a further shuffle, upon which the system may select and present a different photo in the main screen, according to one or more of the exemplary methods as described below. Alternatively, the user may, for example, select the displayed photo for further interaction therewith and with photos related to it. Upon selecting the photo presented in response to the shuffle button of FIG. 2, the user is brought to the exemplary user interface screen as shown in FIG. 3. With reference to FIG. 3, there can be seen an upper screen in which is visible the same "dog sitting on a couch" photograph as shown in FIG. 2, and a lower screen where there appear the same photograph as shown in the main screen and another photograph of a dog standing and smiling. These are the two photos in the cluster focusing on Jun. 1, 2011, to which the displayed "dog sitting on couch" photo belongs.

FIG. 4 depicts an exemplary user interface showing multiple date based clusters in temporal sequence, the first of which is the cluster to which the originally displayed randomly chosen "dog sitting on couch" was assigned. Thus, FIGS. 2-4 illustrate one of a very large number of photo viewing and interaction pathways that an initial shuffle command can take a user down. Here, the user chose to see the cluster to which the photo belonged, and then a set of clusters, including that cluster, organized by date. As explained more fully below, date is merely one of hundreds—or even thousands—of possible filters and affinities by which a user can navigate to, or be shown, a new photo that bears some connection to a photo initially presented to the user via a random or pseudo-random shuffle.

Exemplary Process Flow for Shuffle and Pivot Functionalities

Next described are various exemplary process flows that may be used in exemplary embodiments of the present invention to either randomly, and/or pseudo-randomly, display content to a user. Such processes may be used, for example, in a content management and display system such as is shown in FIG. 1.

In general, in the random case an exemplary process operates on the entire available set of content to a user. This may include only content uploaded by a user, or it may also include content made available to a user via sharing functionality. It is here noted that conditions under which, and when, content is shared may be very granular, and the result of numerous simultaneous conditions. Details on sharing functionality in exemplary content management systems are provided in companion U.S. patent application entitled "SHARING CONTENT ITEMS WITH A CONTENT MANAGEMENT SYSTEM", filed on Mar. 15, 2013, Ser. No. 61/801,138, which is hereby fully incorporated herein by this reference.

Similarly, in general, in a pseudo-random case an exemplary system or process may use one or more conditions to limit a set of photos by some affinity or commonality, prior to initiating a random selection.

Figure 5:
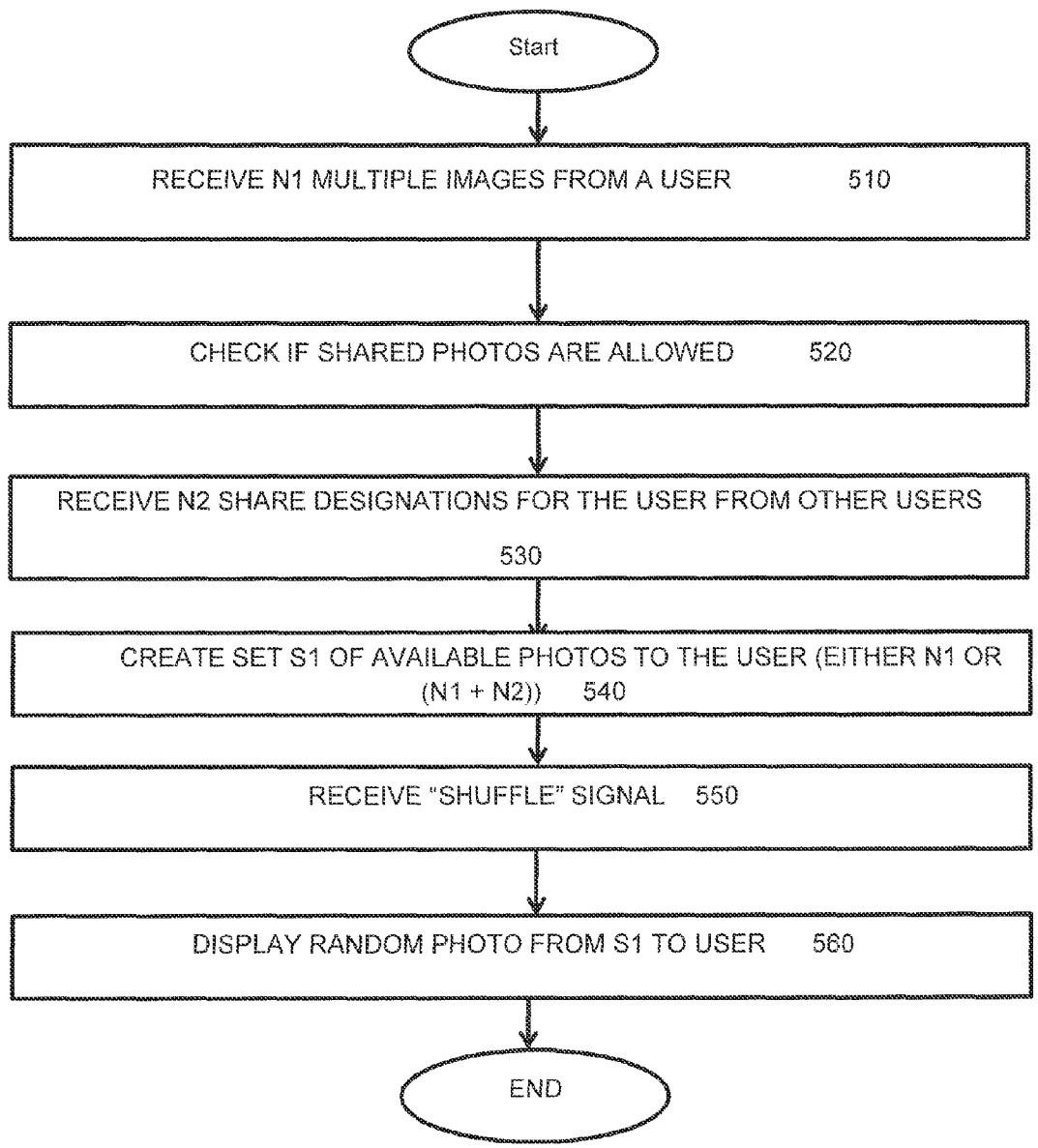
FIG. 5 is an exemplary flowchart for presentation of content via a shuffle in accordance with some embodiments of the invention.

FIG. 5 depicts exemplary process flow for a standard (random) shuffle process. Following start, at 510, an exemplary system receives multiple images, say N1, from a user. Then, at 520, process flow checks to see if shared photos are allowed to be included in the set upon which shuffles operate. If yes, at 530, the system receives N2 share designations for the user, which are photos not owned by the user, but which have been shared with the user. As an interesting and engaging default, shares may generally be allowed, which is assumed in this example. Thus, it may be a system parameter as to whether shared photos are included or not included in shuffles and pivots, and whether or not such a parameter is user configurable, and if so, whether configurable. Thus, this parameter may be set by the system or it may be set by a user, for example. Obviously if shares are not allowed, process flow would skip to 540. At 540 the exemplary content management system may create a set, S1, of available photos to that user that may be drawn from for a shuffle. S1 will either be the N1 photos which are owned by the user himself, or N1+N2 photos which includes the user's own photos and all those photos for which other users have granted sharing rights to the user. Once the set S1 of available photos is known the system is in position to respond to a shuffle signal. At 550 the system receives a shuffle signal and at 560, in response thereto, the system chooses one of the photos from S1 and displays it to the user. It is noted at this juncture that in order to display random photos, various known random number generators may be used. The random number generator takes as an input the total number of photos available S1, generates a random number and maps it to the set of photos S1 to select one of them. In exemplary embodiments various techniques may be used, such as, for example, generating a random number between 0 and 1, and multiplying tit by the number of elements in the set S1, such as N1 or {N1+N2}, as noted above. Once the random photo has been displayed to the user, process flow ends.

Figure 6:
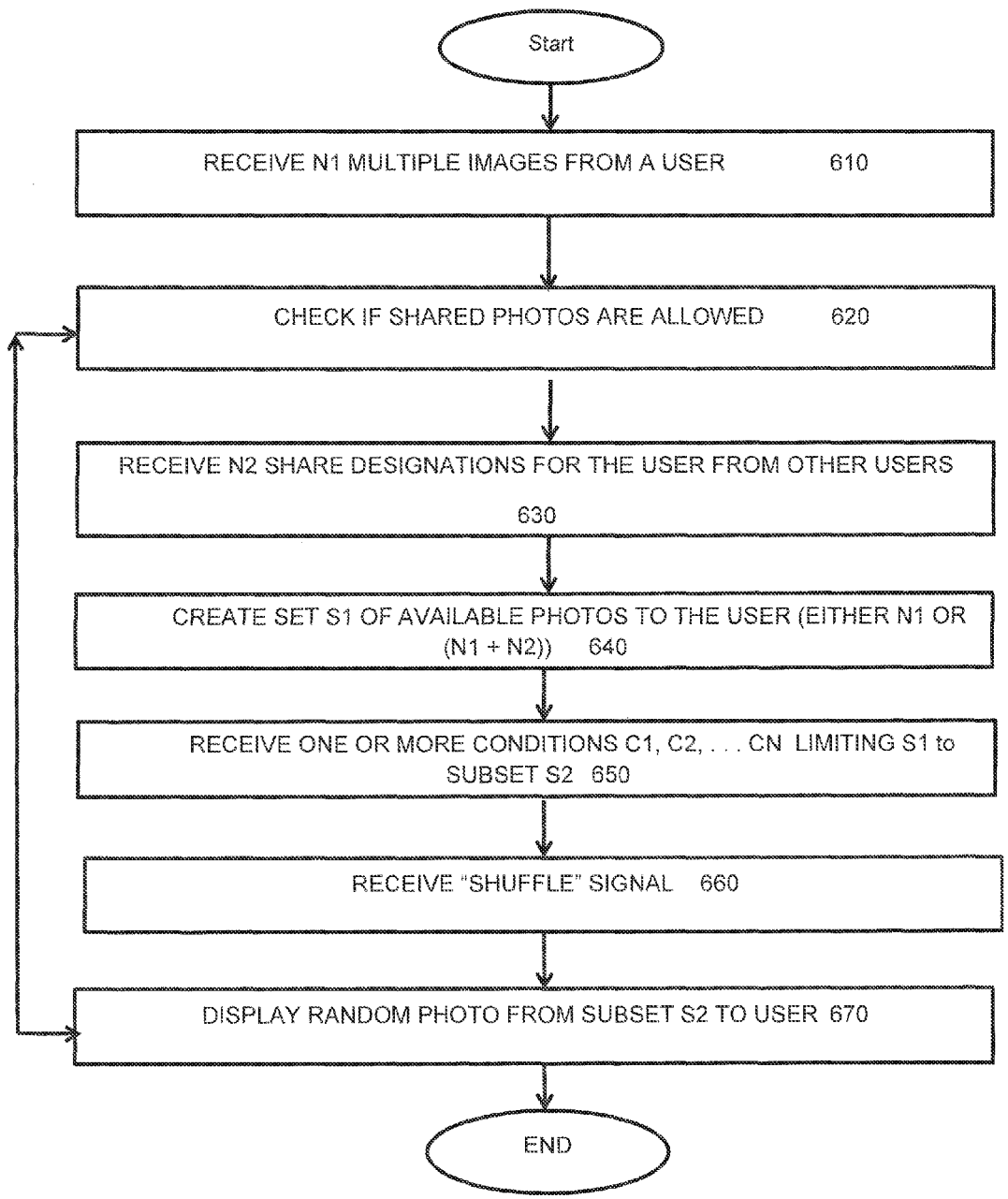
FIG. 6 is an exemplary flowchart for presentation of content via a shuffle in accordance with some embodiments of the invention.

Given the basic shuffle functionality described in FIG. 5, in exemplary embodiments of the present invention, one or more conditions, C1, C2 . . . CN, can be received by an exemplary content management system and used to limit the set S1, as shown in FIG. 5 at 540, to a smaller set, subset S2, from which the random photo can be selected. Thus, FIG. 6 illustrates this guided, constrained, or pseudo-random functionality. FIG. 6 is identical to FIG. 5 as regards its first four blocks 610-640. It is at 650 that the process depicted in FIG. 6 differs from that of FIG. 5. With reference to FIG. 6, at 650 the exemplary content management system may receive one or more conditions, C1, C2 . . . CN, as shown, from a user, from preset account parameters, or from another system process, such as, for example, a module that tracks a user's behavior and viewing activity on a content management system, and extracts preferences and attributes about the user, then uses those to create or inform conditions C1, C2, . . . CN. Any combination of sources for such conditions may, for example, be used.

Using these conditions, which can be combined or aggregated, the set S1 of available photos to the user (e.g., either N1 or N1+N2) may be limited to obtain a subset S2 which satisfies all conditions C1, C2 . . . CN, that were received at 650. Upon receiving a shuffle signal at 660, an exemplary system using subset S2 as the universe of photos to operate upon, may generate a random number process and select a photo from subset S2 to display to the user at 670. Having displayed the random photo to the user from the now-truncated subset S2, process flow may end, or, if the user wishes to shuffle again, process flow may return to 620 and repeat. Users may choose to repeat the guided shuffle of FIG. 6 multiple times. Or, alternatively, they may decide that they are interested in seeing further content related to the last photo that was "shuffled" to them. In such case the exemplary "pivot" process of FIG. 7 may come into play.

It is noted that in exemplary embodiments of the present invention a content management system may pre-fetch a number of photos to display in case a user seeks multiple shuffles as per the processes of either FIG. 5 or of FIG. 6. Even if conditions are configurable with each shuffle, user's often keep the same set of conditions and desire to see what will be displayed. By prefetching a number of photos as soon as a user enters a shuffle, or even before he does, there is no need to perform the selections in real time and potentially cause wait states.

Pivot Functionality

FIG. 7 illustrates a different use of the basic shuffle technology subject to conditions. The exemplary process flow of FIG. 7 assumes that a user has had a photo, Photo K, displayed to him or her, by whatever means. This may be the shuffle of FIG. 5, the guided or constrained shuffle of FIG. 6, or any other content selection process or interaction supported by content management system 100, of FIG. 1, for example. The functionality of FIG. 7 then, in similar fashion to the shuffle functionality of FIG. 6, receives a number of selection conditions, here termed "affinities," for pivoting to a new photo, Photo K+1, upon receiving a signal from a user or from a system generated process. Thus, the process flow of FIG. 7 is not a shuffle functionality per se but rather a pivot or a guided shuffle from an existing viewing to another related one within a same subset of photos. Generally, but not always, the randomness is more highly constrained in a pivot than in a pseudo-random shuffle. The process of FIG. 7 can be repeated infinitely as long as a user or a system generates an appropriate pivot signal as shown. Thus, with reference to FIG. 7, from start, the exemplary process displays a current photo K to a user at 710. At 720, the system checks to see if shared photos are to be included in the photos to be presented in a pivot. Given these conditions, at 730 the exemplary system may create a Set S1 of all possible photos to pivot to, as described above. At 740 the system receives one or more affinities, A1, A2, etc. . . . . . These describe selection conditions for pivoting to a new photo, given S1, and thus at 740 a subset S3 of similar photos that may be pivoted to is also created. Subset S3 is, in general, a subset of S1, and is akin to subset S2 as depicted at FIG. 6, block 660, inasmuch as the affinities A1, A2, . . . , AN, received at 740 are akin to the conditions C1, C2 . . . CN received at 650 in FIG. 6. Next, process flow moves to 750 where the system receives a user or a system generated pivot signal. Generally, the pivot signal is effected by a user engaging with an active button, bar or the like, akin to a shuffle button which may be labeled "pivot." Alternatively, for a pivot to other photos which contain a person of interest, a user may touch or click on the person's face in some gesture or the like, and then see a random photo containing that person, or his family, or the like. In general, the user will choose to pivot, but under certain circumstances, the system may pivot on its own in various defined contexts. Once the pivot signal is received at 740, the system may then display a random next photo K+1 from Subset S3 to the user at 760. From there process flow may either end, or may return to 720 and repeat, now pivoting off of the photo displayed at 760, i.e., Photo K+1.

It is noted that the exemplary process shown in FIG. 7 always makes the system ready to receive a new pivot signal, and therefore process flow continues to circle as long as a pivot signal is received and a random photo from Subset S3 is displayed, the system then seeks additional conditions for pivoting to a new photo. In alternate exemplary embodiments, process flow could stop at 750 unless and until another pivot signal is received in which case then process flow would return to 720. That is a design choice and a matter of whether a system finds it useful to exert resources to prepare for an expected signal as opposed to only respond to the signal on a "made-to-order" basis. Both approaches, and various others, are understood to be included in various exemplary embodiments of the present invention.

Thus, in exemplary embodiments of the present invention, a pseudo-random selection of photos may be quite engaging and interesting to a user. The level of interest and the mystery or surprise in what kind of photo will next be presented is part of the enjoyment of an exemplary site or application.

In exemplary embodiments of the present invention, there may be a wide number of conditions which may be used to select a next photo to be displayed pursuant to either a shuffle or a pivot signal. For example, the next photo may be time-based. For example, the system may randomly select a photo from the current day in previous years such as "six years ago today." Or the photo to be displayed may be one that has been recently captured such as "a photo from last weekend." This is especially useful if the user has been on an outing or excursion on a particular recent day, such as a weekend or a national holiday, has taken a lot photos, has uploaded them to a content management system and now wants to be surprised by viewing random photos from that event. Instead of he or she sorting through them on their own, the system simply continually randomly generates photos from that very limited set.

Alternatively, the conditions may be event-based and thus, for example, a photo may be selected from a past holiday if the current day is relatively a short time before, on, or a short time following, a particular holiday or holiday season. For example, such a condition can be "Christmas Day Four Years Ago," "Last Halloween," "one of those Easters when the children were young."

Additionally, the conditions may be location-based, where a photo is selected from a nearby location such as, for example, current location, home, work, a national landmark or known place that the user frequents such as Times Square, Madison Square Garden, the Superdome, Yellowstone National Park, etc. Or, alternatively, the conditions may be activity-based such as photos recently viewed or commented on by friends, photos recently shared within a defined period of time reaching back from today, or photos not yet viewed since they have been loaded within a defined period of time reaching back from the current day.

Alternatively, the conditions may be relationship-based such as, for example, selecting a photo containing a person if the current day is a significant date to that person, such as, for example, their birthday, an anniversary, etc. Continuing on the relationship theme the photo can be selected which contains a person that has not appeared in any recent photos, i.e., a friend that has not been a seen in a long time, or who is a relative or friend who passed away within some defined time. Or, the photo can be selected if it contains one or more people with a defined high affinity to the viewer/user such as, for example, pictures containing one or more of the user's children, one or more of the user's parents or grandparents, one or more of the user's girlfriends, one or more of the user's fraternity or sorority buddies or colleagues.

Finally, conditions may be negative. Thus a condition of affinity may not only select to a goal or to a specified condition or class but may also exclude photos that are, for example, too blurry, too dark, tagged by the system as undesirable in some way or uninteresting. Additional exclusion conditions or affinities may include photos that have been viewed within a recent period of time which will lack novelty to the user, such as, for example, photos viewed within the past week, the past two weeks, the past month, etc. Or, exclusionary conditions may refer to persons that the user just does not want to see at the present time. For example, if sharing the viewing experience with one's spouse, one may want to exclude past lovers just to avoid having to explain why you have photos of your ex-girlfriends on your favorite content management system.

Pivot Affinities

As described above, with reference to FIG. 7, given a photo, possibly chosen via shuffle, or otherwise, other interesting photos may be derived from the current photo to pivot to in exemplary embodiments of the present invention. This pivot functionality may provide a near endless browsing experience for a user. Possible ways to select interesting photos which are in some way similar to a single photo are based upon the affinities illustrated at 740 of FIG. 7. In exemplary embodiments of the present invention, such affinities may include, for example, photos near the same date as the current date; photos that were taken at the same time of day as the present time, regardless of date; or photos near the same location as the photo being seen, based on points of interest such as, for example, national monuments, friends' houses, former apartments, former workplaces, photos containing all or some of the people in the current photo, photos containing one of the people within the photo across all time, photos containing similar scenes such as sunsets, the beach, a particular type of food, or a particular restaurant, mountains, cycling, golf, swimming, etc.; photos taken under the same weather conditions such as, for example, rain, snow, sun, hurricane, storm, etc., or, for example, photos taken with the same camera. This latter affinity would exploit the camera signature that is generally stored with photographs as part of the metadata, as described above.

In addition, photos obtained from the same friend, friends, or members of a group or association may operate as an affinity. Exemplary content management systems may track these and other details, including who and from whom a user shares with and is shared with, for example, as well as which other users commonly appear in a first user's photos, which people keep appearing in photos of a given set of users, etc. For example, all of the grandchildren of a beloved grandmother may have significant affinities inter se, and may share photos with each other. This information may be tracked, in exemplary embodiments of the present invention, and may be used to propose either conditions or affinities to a user pursuant to a shuffle or pivot interaction.

Alternatively, a user may be provided with a "set conditions" or "set affinities" box or menu within a user interface once a shuffle or pivot is signaled, for example. Or, still alternatively, a set of gestures may be mapped to displays of photos whereby upon touching or clicking, or hovering, for example, over a person's or animal's face a menu may appear seeking guidance for affinities to photos with that person in them, or with his family in them, or with common friends in them, etc. A simple gesture without a menu may be upon swiping a person's face, all photos with that person in them become the pivot subset S3.

Thus in exemplary embodiments of the present invention, filters, affinities or conditions can be combined and, as shown in FIGS. 5 and 6, extended to pull from photos owned by the viewer, or both from photos owned by the viewer and those shared with the viewer, or, in certain circumstances, from photos only shared with the viewer from third parties, such as "recently shared photos."

Exemplary Implementations

Any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/Figs. can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary flow charts have been provided and described, it is understood that the depicted process flow may occur in various sequences, in either parallel or distributed processing, and is not restricted to any particular sequence within the realm of possibility or practicability, as the case may be.

While there have been described methods for organization and presentation of photos thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method for pseudo-randomly navigating a collection of images, comprising:
   accessing a set of images;
   receiving a set of conditions that an image must satisfy, the set of conditions comprising at least one image characteristic;
   creating, by at least one processor, a reduced subset of images, from the set of images, that satisfy the set of conditions by selecting a plurality of images from the set of images that include the at least one image characteristic while excluding at least one image from the set of images that does not include the at least one image characteristic;

displaying, to a user via a graphical user interface of a client device, a shuffle input comprising a selectable graphical element presented via the graphical user interface;

receiving a first user selection of the shuffle input requesting a random image that satisfies the set of conditions;

in response to receiving the first user selection of the shuffle input requesting the random image, pseudo-randomly selecting a first image from the set of images by randomly identifying, by the at least one processor, the first image from the reduced subset of images that satisfy the set of conditions without considering the at least one image excluded from the reduced subset of images;

displaying, to the user via the graphical user interface of the client device, the first image in conjunction with the shuffle input, the shuffle input positioned over a portion of the displayed first image;

receiving a second user selection of the shuffle input requesting another random image that satisfies the set of conditions; and in response to receiving the second user selection of the shuffle input requesting another random image, pseudo-randomly selecting a second image from the set of images by randomly identifying, by the at least one processor, a second image from the reduced subset of images that satisfy the set of conditions without considering the at least one image excluded from the reduced subset of images; and displaying, to the user via the graphical user interface of the client device, the second image in conjunction with the shuffle input, the shuffle input positioned over a portion of the displayed second image.

2. The method of claim 1, further comprising:
determining if shared images are allowed to be displayed to the user in a random presentation.

3. The method of claim 2, further comprising:
receiving a set of images designated as shared with the user,
wherein creating the reduced subset of images further comprises including, in the reduced subset of images, at least one image having the at least one image characteristic from the set of images designated as shared with the user.

4. The method of claim 1, further comprising receiving the set of conditions from the user, wherein creating the reduced subset of images is performed in response to receiving the set of conditions from the user.

5. The method of claim 4, wherein receiving the set of conditions from the user comprises detecting a user interaction with respect to an image displayed on the graphical user interface of the client device, the user interaction designating the at least one image characteristic.

6. The method of claim 1, wherein receiving the first user selection of the shuffle input comprises detecting a first touch gesture selecting the selectable graphical element presented via the graphical user interface of the client device; and wherein receiving the second user selection of the shuffle input comprises detecting a second touch gesture selecting the selectable graphical element presented via the graphical user interface of the client device.

7. The method of claim 1, wherein the set of conditions further comprises at least one of a time based condition, a location based condition, a relationship based condition, or an event based condition.

8. A non-transitory computer readable medium containing instructions that, when executed by at least one processor of a computing device, cause the computing device to:
access a set of images;
receive a set of conditions that an image must satisfy, the set of conditions comprising at least one image characteristic;
create a reduced subset of images, from the set of images, that satisfy the set of conditions by selecting a plurality of images from the set of images that include the at least one image characteristic while excluding at least one image from the set of images that does not include the at least one image characteristic;
display, to a user via a graphical user interface of a client device, a shuffle input comprising a selectable graphical element presented via the graphical user interface;
receive a first user selection of the shuffle input requesting a random image that satisfies the set of conditions;
in response to receiving the first user selection of the shuffle input requesting the random image, pseudo-randomly selecting a first image from the set of images by randomly identifying the first image from the reduced subset of images that satisfy the set of conditions without considering the at least one image excluded from the reduced subset of images;
display, to the user via the graphical user interface of the client device, the first image in conjunction with the shuffle input, the shuffle input positioned over a portion of the displayed first image;
receive a second user selection of the shuffle input requesting another random image that satisfies the set of conditions; and
in response to receiving the second user selection of the shuffle input requesting another random image, pseudo-randomly select a second image from the set of images by randomly identifying the second image from the reduced subset of images that satisfy the set of conditions without considering the at least one image excluded from the reduced subset of images; and
display, to the user via the graphical user interface of the client device, the second image in conjunction with the shuffle input, the shuffle input positioned over a portion of the displayed second image.

9. The non-transitory computer readable medium of claim 8, said instructions further causing the computing device to:
determine if shared images are allowed to be displayed to the user in a random presentation.

10. The non-transitory computer readable medium of claim 9, said instructions further causing the computing device to:
receive a set of images designated as shared with the user,
wherein creating the reduced subset of images further comprises creating the reduced subset of images from the set of images designated as shared with the user, the reduced subset of images comprising at least one image having the at least one image characteristic from the set of images designated as shared with the user.

11. The non-transitory computer readable medium of claim 8 further comprising receiving the set of conditions from the user, wherein creating the reduced subset of images is performed in response to receiving the set of conditions from the user.

12. The non-transitory computer readable medium of claim 11, wherein receiving the set of conditions from the user comprises detecting a user interaction with respect to an image displayed on the graphical user interface of the client device, the user interaction designating the at least one image characteristic.

13. The non-transitory computer readable medium of claim 8, wherein receiving the first user selection of the shuffle input comprises detecting a first user touch gesture selecting the selectable graphical element presented via the graphical user interface of the client device; and wherein receiving the second user selection of the shuffle input comprises detecting a second touch gesture selecting the selectable graphical element presented via the graphical user interface of the client device.

14. The non-transitory computer readable medium of claim 8, wherein the set of conditions further comprises at least one of a time based condition, a location based condition, a relationship based condition, or an event based condition.

15. A system for randomly navigating a collection of images, comprising:
one or more processors; and
memory containing instructions that, when executed, cause one or more processors to:
access a set of images;
receive a set of conditions that an image must satisfy, the set of conditions comprising at least one image characteristic;
create a reduced subset of images, from the set of images, that satisfy the set of conditions by selecting a plurality of images from the set of images that include the at least one image characteristic while excluding at least one image from the set of images that does not include the at least one image characteristics;
display, to a user via a graphical user interface of a client device, a shuffle input comprising a selectable graphical element presented via the graphical user interface;
receive a first user selection of the shuffle input requesting a random image that satisfies the set of conditions;
in response to receiving the first user selection of the shuffle input requesting the random image, pseudo-randomly selecting a first image from the set of images by randomly identifying the first image from the reduced subset of images that satisfy the set of conditions without considering the at least one image excluded from the reduced set of images;
display, to the user via the graphical user interface of the client device, the first image in conjunction with the shuffle input, the shuffle input positioned over a portion of the displayed first image;
receive a second user selection of the shuffle input requesting another random image that satisfies the set of conditions; and
in response to receiving the second user selection of the shuffle input requesting another random image, pseudo-randomly select a second image from the set of images by randomly identifying the second image from the reduced subset of images that satisfy the set of conditions without considering the at least one image excluded from the reduced subset of images.

16. The system of claim 15, wherein said instructions further cause said processor to determine if shared images are allowed to be displayed to the user in a random presentation.

17. The system of claim 16, said instructions further causing the computing device to:
receive a set of images designated as shared with the user, wherein creating the reduced subset of images further comprises including, in the reduced subset of images, at least one image having the at least one image characteristic from the set of images designated as shared with the user.

18. The method of claim 1, further comprising:
displaying an image from the set of images to the user; and
wherein receiving the set of conditions comprises receiving an indication of at least one person present in the image; and
wherein creating the reduced subset of images comprises creating the reduced subset of images from images having the at least one person present in the image.

19. The non-transitory computer readable medium of claim 8, said instructions further causing the computing device to:
display an image from the set of images to the user; and
wherein receiving the set of conditions comprises receiving an indication of at least one person present in the image; and
wherein creating the reduced subset of images comprises creating the reduced subset of images from images having the at least one person present in the image.

20. The system of claim 15, wherein said instructions further cause the computing device to:
display an image from the set of images to the user; and
wherein receiving the set of conditions comprises receiving an indication of at least one person present in the image; and
wherein creating the reduced subset of images comprises creating the reduced subset of images from having the at least one person present in the image.

21. The method of claim 1, wherein pseudo-randomly selecting the first image from the set of images comprises:
generating, by the at least one processor, a random number; and
randomly identifying, from the reduced subset of images that satisfy the set of conditions, the first image based on the random number.

22. The method of claim 1, wherein pseudo-randomly selecting the first image from the set of images comprises:
generating, by the at least one processor, a plurality of random numbers; and
randomly identifying, from the reduced subset of images that satisfy the set of conditions, the first image and the second image based on the plurality of random numbers.

23. The method of claim 1, further comprising:
receiving at least one additional condition;
creating, by the at least one processor, a further reduced subset of images, from the reduced subset of images, that satisfy both the set of conditions and the at least one additional condition; and
wherein pseudo-randomly selecting the second image from the set of images comprises randomly identifying, by the at least one processor, the second image from the further reduced subset of images that satisfy both the set of conditions and the at least one additional condition.

24. The method of claim 23, wherein the at least one additional condition comprises at least one image characteristic present in the displayed first image.

25. The method of claim 23, wherein:
receiving the at least one additional condition comprises detecting a first touch input with respect to the displayed first image selecting at least one additional image characteristic; and receiving the second user selection of the shuffle input comprises detecting a second touch input with respect to the graphical element positioned over the portion of the displayed first image.

26. The method of claim 1, wherein the shuffle input is displayed at a same location within the graphical user interface with respect to both the first image and the second image.

\* \* \* \* \*